United States Patent
Mutoh

(10) Patent No.: US 6,570,726 B2
(45) Date of Patent: May 27, 2003

(54) DROP DETECTION SYSTEMS FOR PORTABLE INFORMATION PROCESSING APPARATUS

(75) Inventor: Hiroshi Mutoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/941,047

(22) Filed: Aug. 28, 2001

(65) Prior Publication Data

US 2002/0030911 A1 Mar. 14, 2002

Related U.S. Application Data

(63) Continuation of application No. PCT/JP99/03732, filed on Jul. 9, 1999.

(51) Int. Cl.[7] .......................... G11B 15/04; G11B 19/04; G11B 23/02; G11B 23/03
(52) U.S. Cl. .......................... 360/60; 360/69; 360/132; 360/133
(58) Field of Search .......................... 360/60, 69, 132, 360/133

(56) References Cited

U.S. PATENT DOCUMENTS

| | | | |
|---|---|---|---|
| 5,032,775 A | * | 7/1991 | Mizuno et al. ............... 701/25 |
| 5,982,573 A | * | 11/1999 | Henze .......................... 360/75 |
| 6,212,026 B1 | * | 4/2001 | Ohmi et al. .................. 360/60 |

FOREIGN PATENT DOCUMENTS

| | | |
|---|---|---|
| JP | 62-89269 | 4/1987 |
| JP | 63-149887 | 6/1988 |
| JP | 63-152070 | 6/1988 |
| JP | 4-60956 | 2/1992 |
| JP | 4-60957 | 2/1992 |
| JP | 4-221478 | 8/1992 |
| JP | 4-268254 | 9/1992 |
| JP | 5-101573 | 4/1993 |
| JP | 6203505 A | 7/1994 |
| JP | 6275002 A | 9/1994 |
| JP | 7130115 A | 5/1995 |
| JP | WO 01/04897 A1 | 1/2001 |
| JP | 3-241564 | 10/2001 |

* cited by examiner

Primary Examiner—Regina N. Holder
(74) Attorney, Agent, or Firm—Greer, Burns & Crain, Ltd.

(57) ABSTRACT

A portable information processing apparatus 10 which is a lap top type has a housing 11 with a hard disk drive 14. At the bottom side 11b of the housing 11, a first touch sensor 20 is provided adjacent a corner 22 and a second touch sensor 21 is provided adjacent a corner 24 which is at a diagonal side. Once the portable information processing apparatus 10 leaves a table, output signals of the respective touch sensors 20 and 21 vary precisely. By comparing the output signals of the respective touch sensors 20 and 21 with a true value table memorized in a memory, it is decided whether the portable information processing apparatus 10 has started dropping. If the portable information processing apparatus 10 starts dropping, the hard disk drive 14 enters the withdrawal mode.

23 Claims, 16 Drawing Sheets

| OUTPUT SIGNAL OF THE SECOND TOUCH SENSOR 21 | | OUTPUT SIGNAL OF THE FIRST TOUCH SENSOR 20 |
|---|---|---|
| 0 |  | 0 |
| 1 |  | 0 |
| 0 |  | 1 |
| 1 |  | 1 |

FIG.8

| 71 | 72 | 73 |
|---|---|---|
| 0 | 0 | DROPPING |
| 1 | 0 | NORMAL |
| 0 | 1 | DROPPING |
| 1 | 1 | NORMAL |

DROP DETECTION SYSTEMS FOR PORTABLE INFORMATION PROCESSING APPARATUS

This is a continuation of International Application No. PCT/JP99/03732 filed Jul. 9, 1999.

BACKGROUND OF THE INVENTION

1. Field of the Invention

This present invention generally relates to portable information processing apparatuses having hard disk drives and, more particularly, to a portable information processing apparatus which an operator operates on the table after carrying; the operator sitting on the chair operates on his/her knees; the operator operates on his/her palm; or the operator operates in a handheld state by one hand or both hands.

2. Description of the Related Art

The portable information processing apparatus having the hard disk drive is in a danger state to drop down in error as compared with an information processing apparatus set on the table, because the portable information processing apparatus is operated on the operator's knees after being carried or in the handheld state by one hand.

Furthermore, the impact resistance of the hard disk drive is low due to its mechanisms. The limit of the power of the impact resistance of the hard disk drive is about 100 G at the highest when it operates, and is about 300 G to 500 G when it does not operate.

If an impact having a strength beyond the limit is applied to the hard disk drive, the recording of information will be disrupted due to unwanted movement of the slider, and a surface of a recording area of a hard disk will be scratched by the slider that touches with the hard disk.

Therefore, preventive measures against the drop (for instance, to inhibit information from being recorded on the hard disk drive and to take the slider to a withdrawal area of the hard disk) are demanded for the portable information processing apparatus having the hard disk drive.

Also, during the progress of the operation of the portable information processing apparatus on the table, the operator may turn a direction of the portable information processing apparatus by both hands and may pick it up from the table in order to show indications on the screen of a liquid crystal panel to other persons. Accordingly, the above state should also be considered for the preventive measures against the drop.

Generally, a way to protect against damage due to drop of the portable information processing apparatus having the hard disk drive is to incorporate an acceleration sensor into the portable information processing apparatus, detect dropping of the portable information processing apparatus by an output of the acceleration sensor, and take the slider from the recording area to the withdrawal area of the hard disk by activating the actuator.

There is, however, a possibility that there may not be enough time to take the slider to the withdrawal area of the hard disk, because the activating of the actuator starts after the acceleration sensor detects the portable information processing apparatus dropping.

In order to solve the above problem, there are two mechanisms described in Japanese Laid-Open Patent Application No. 06-203505 for example.

One mechanism has a structure in which a gyrosensor built in the portable information processing apparatus detects the acceleration of the displacement of the portable information processing apparatus, and a control part built in the portable information processing apparatus outputs a head withdrawal signal and activates a head activator part when the detected acceleration is higher than a designated value.

The other mechanism has a structure in which a magnetic disk rotating at high speed is used as a gyro. Four pressure sensors are provided in the portable information processing apparatus and are located at four corners of the base side of the hard disk drives respectively in the mechanism. Pressure sensed by respective pressure sensors varies when the position of the portable information processing apparatus is inclined. A control part outputs a head withdrawal signal and activates a head activator part when the detected pressure is higher than a designated value.

According to the respective mechanisms, the magnetic head starts moving to the withdrawal area on the magnetic disk when the portable information processing apparatus starts dropping, so that the magnetic head and the recording area of the magnetic disk can be prevented from being damaged by impact caused when the portable information processing apparatus drops to the floor.

However, the two mechanisms only indirectly detect the portable information processing apparatus leaving the table by variation of the acceleration. This is because one mechanism utilizes the gyrosensor and the other mechanism utilizes the magnetic disk rotating at high speed as gyro and the pressure sensors detecting variation in pressure. Accordingly, the above mechanisms have a problem with respect to sensitivity. More particularly, it is difficult to detect, with high reliance, the portable information processing apparatus dropping from the table or the operator's knees just after the start of dropping.

Therefore, there is a possibility that the gyrosensor may not detect the portable information processing apparatus dropping although the portable information processing apparatus is actually dropping. Thus, the magnetic head and the recording area of the magnetic disk may be damaged by impact caused when the portable information processing apparatus drops to the floor.

Besides, in a case where the operator turns the direction of the portable information processing apparatus by both hands and picks it up from the table in order to show indications on the screen of the liquid crystal panel to other persons during the progress of the operation on the table, there is a possibility that the control part may decide that the portable information processing apparatus has started dropping.

Accordingly, in the case where the control part decides that the portable information processing apparatus has started dropping when the operator turns the direction of the portable information processing apparatus by both hands and picks it up from the table, there is a problem that it is delayed to start an action of the portable information processing apparatus corresponding to a next operation after returning it on the table.

SUMMARY OF THE INVENTION

Accordingly, it is a general object of the present invention is to provide a novel and useful portable information processing apparatus in which the problems described above are eliminated.

Another and more specific object of the present invention is to provide a portable information processing apparatus having high reliability to decide that the portable information processing apparatus has started dropping.

To carry out the object, the portable information processing apparatus comprises a touch sensor or a pressure sensor provided at a bottom side of a housing, and a deciding device deciding based on an output signal of said sensor that said portable information processing apparatus is in a state where said portable information processing apparatus is normal and dropping, wherein said deciding device comprises a memory memorizing a true value table and a comparing device comparing said output signal of said sensor with said true value table which is read out from said memory.

Further object of the present invention is to provide a portable information processing apparatus which is applicable to vary a standard for deciding that said portable information processing apparatus has started dropping based on a state where said portable information processing apparatus is used.

To carry out the object, the memory has a construction to be able to write in optionally, if desired.

Another object of the present invention is to provide an electric device which is applicable to be protected in case that said electric device falls on the floor. To carry out the object, the portable information processing apparatus, has a housing with a hard disk drive inside, and also has a control device controlling the portable information processing apparatus to prohibit writing in a first mode and then enter in a withdrawal mode in case the deciding device decides that the portable information processing apparatus is dropping.

Other and further objects of the present invention will be apparent from the following detailed description when read in conjunction with the accompanying drawings.

BRIEF DESCRIPTION OF THE DRAWINGS

FIG. 8 is a view showing a true value table in a state where the portable information processing apparatus supported by the operator's one hand according to FIG. 7;

DETAIL DESCRIPTION OF THE PREFERRED EMBODIMENTS

[First Embodiment]

Figure 1A:
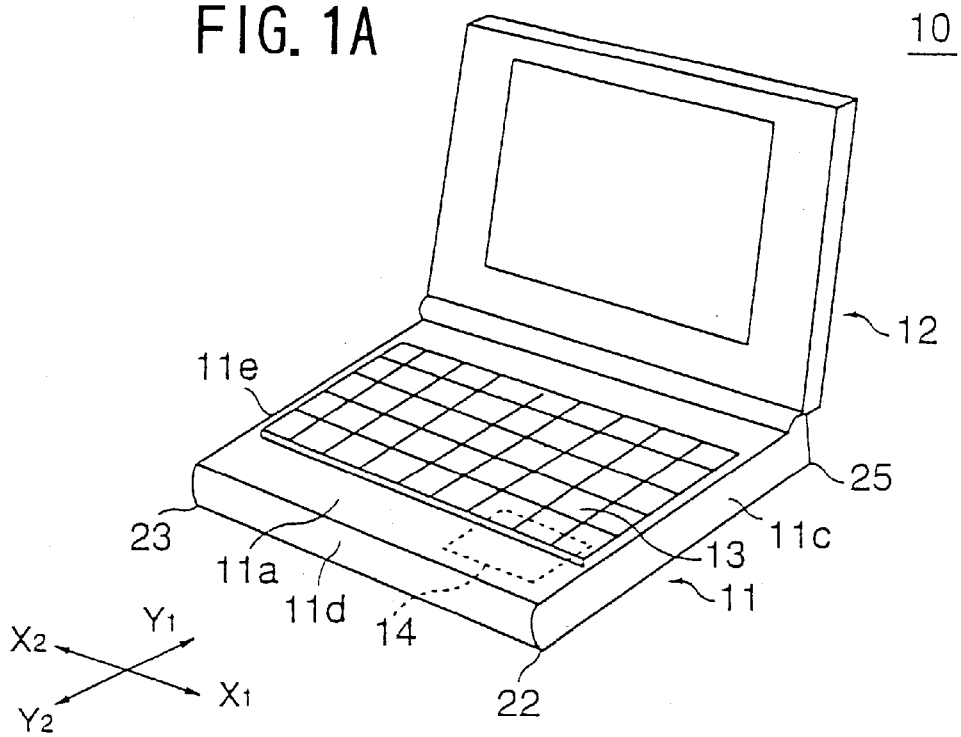
FIGS. 1A and 1B are perspective views showing a first example of a portable information processing apparatus according to the present invention.
Figure 1B:
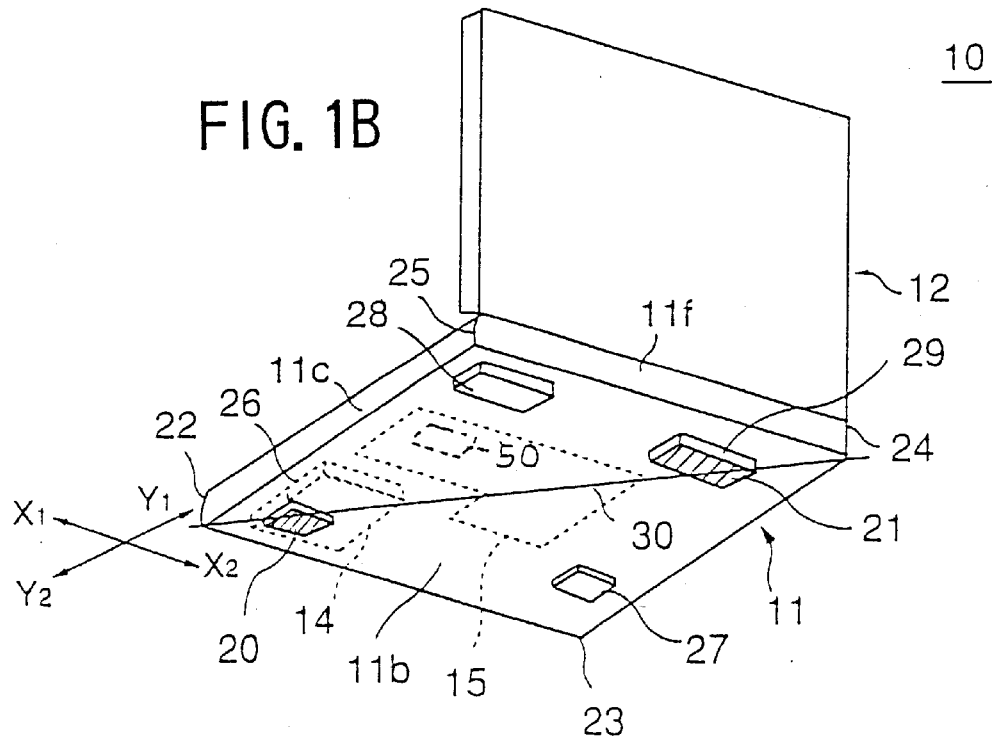

FIGS. 1A and 1B respectively show a front and perspective view and a bottom and perspective view of a portable information processing apparatus 10 according to a first embodiment of the present invention.

The portable information processing apparatus 10 is so called a lap top type information processing apparatus and includes a flat and rectangular housing 11 and a liquid crystal panel 12 which is applicable to open and close with respect to the housing 11. The housing 11 has a keyboard 13 on an upper side 11a of the housing 11 and is equipped with a hard disk drive 14 and a printed-circuit board assembly 15 on which assembly semiconductor parts are mounted. X1 and X2 respectively show width directions of the housing 11, and Y1 and Y2 respectively show depth directions of the housing 11.

The portable information processing apparatus 10 is carried in a state in which the liquid crystal panel 12 is closed. When the operator operates the portable information processing apparatus 10 on the table or the operator's knees, the liquid crystal panel 12 is opened. There are a first touch sensor 20, and a second touch sensor 21 on a bottom side 11b of the housing 11. The bottom side 11b of the housing 11 has leg parts 26, 27, 28, and 29, which are adjacent to respective corners 22, 23, 24, and 25 of the housing 11.

An X1-direction side 11c and a front side 11d of the housing 11 form the corner 22. An X2-direction side 11e and the front side 11d form the corner 23. The side 11e and a rear side 11f of the housing 11 form the corner 24. The side 11c and the rear side 11f of the housing 11 form the corner 25.

The leg parts 26 and 29 are on a diagonal line 30. The first touch sensor 20 is provided on the surface of the leg part 26, and the second touch sensor 21 is provided on the surface of the leg part 29.

The first touch sensor 20 or the second touch sensor 21 respectively outputs "1" when the first touch sensor 20 or the second touch sensor 21 touches something and "0" when the first touch sensor 20 or the second touch sensor 21 touches nothing.

Figure 2:
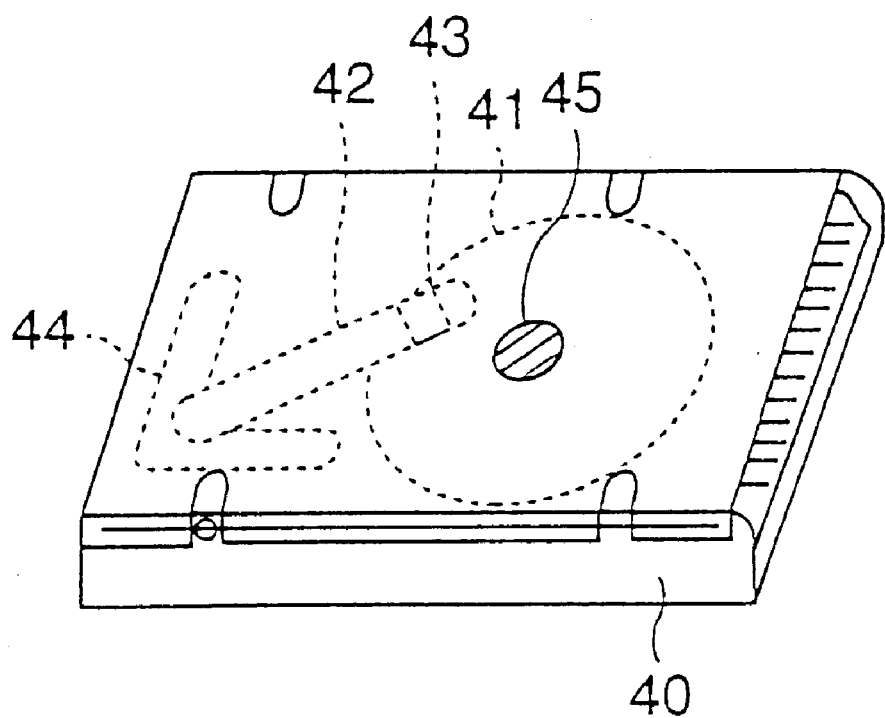
FIG. 2 is a perspective view showing a hard disk drives of the portable information processing apparatus described in FIG. 1.

FIG. 2 is a perspective view showing a hard disk drive 14 of the portable information processing apparatus 10 described in FIG. 1. A hard disk 41, a pivotable arm 42, a slider 43 having a magnetic head, and a driving mechanism 44 for the arm 42 are built in an airtight box 40 of the hard disk drive 14. An acceleration sensor 45 is provided on an upper side of the box 40.

Figure 3:
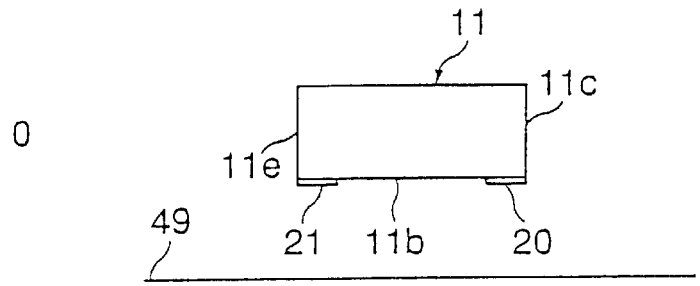
FIG. 3 is a view for explaining the relation between states of the portable information processing apparatus according to the present invention and output signals of respective touch sensors equipped in the portable information processing apparatus.
Figure 3:
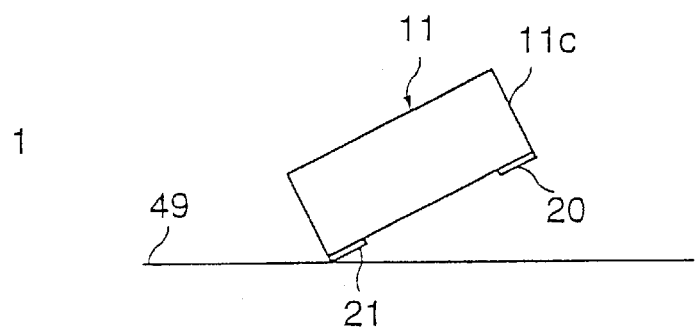
Figure 3:
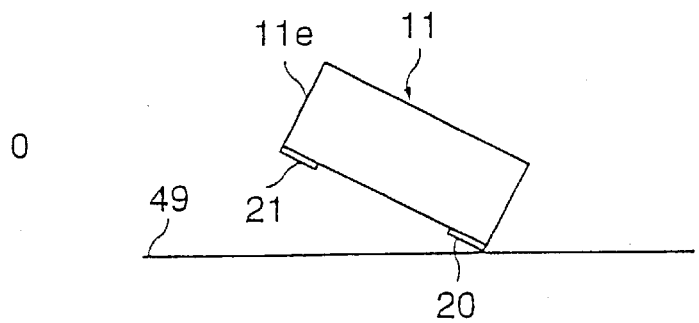
Figure 3:
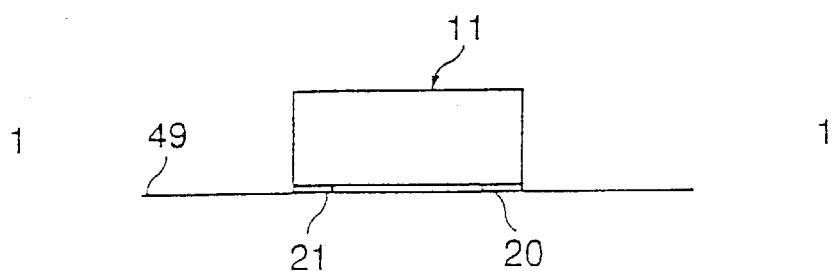

FIG. 3 is a view for explaining the relation between states of the portable information processing apparatus 10 and output signals of the first sensor 20 and the second sensor 21.

In a normal state, namely in a case where the portable information processing apparatus 10 is on the table 49, the operator's knees, or others, both the output signals of the first sensor 20 and of the second sensor 21 are "1".

In a free drop state, namely in a case where the portable information processing apparatus 10 completely leaves the table 49, the operator's knees, or others, both the output signals of the first sensor "20 and of the second sensor 21 are "0".

In a cantilever-like drop state in which the side 11c of the housing 11 of the portable information processing apparatus 10 leaves the table 49, the operator's knee, or others and the side 11e of the housing 11 of the portable information processing apparatus 10 is on the table 49, the operator's knee, or others, the output signal of the first sensor 20 is "0" and the output signal of the second sensor 21 is "1".

In another cantilever-like drop state in which the side 11e of the housing 11 of the portable information processing apparatus 10 leaves the table 49, the operator's knee, or others and the side 11c of the housing 11 of the portable information processing apparatus 10 is on the table 49, the operator's knee, or others, the output signal of the first sensor 20 is "1" and the output signal of the second sensor 21 is "0".

Here, the "normal state" means a different state from a state in which the portable information processing apparatus 10 is dropping, that is a state in which the portable information processing apparatus 10 is stable on the table 49, the operator's knees, or others, or stably supported by operator's hands.

Figure 4:
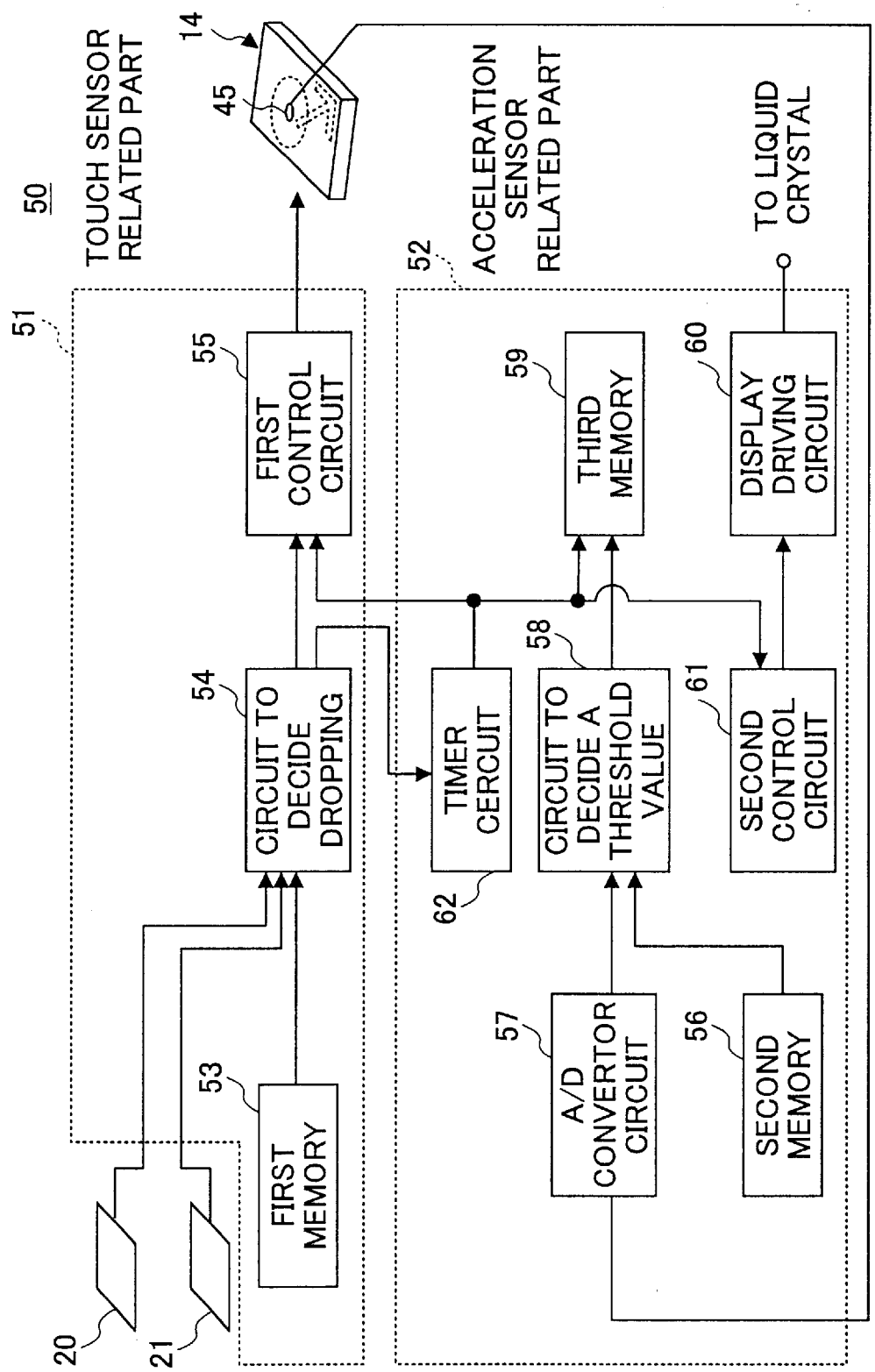
FIG. 4 is a block diagram of a control apparatus of the portable information processing apparatus according to the present invention.

The printed-circuit board assembly 15 includes a control apparatus 50 related to the first sensor 20, the second sensor 21 and an acceleration sensor 45. FIG. 4 is a block diagram of the control apparatus 50 of the portable information processing apparatus 10. The control apparatus 50 includes a touch sensor related part 51 which is related to the first sensor 20 and the second sensor 21, and an acceleration sensor related part 52 which is related to the acceleration sensor 45.

Figure 5:
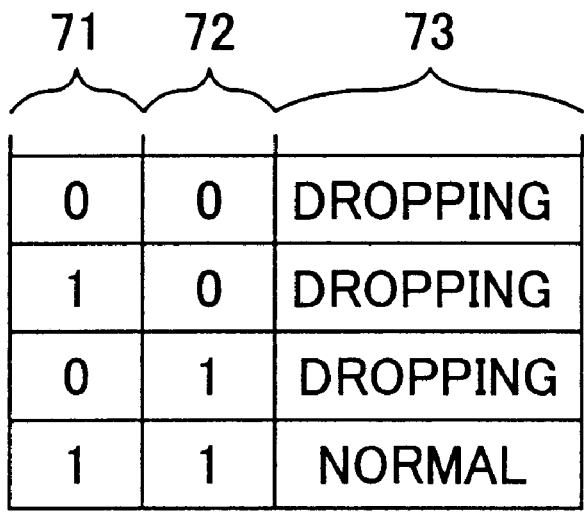
FIG. 5 is a view showing a true value table applied the portable information processing apparatus described in FIG. 1.

The touch sensor related part 51 includes a first memory 53, a circuit 54 to decide dropping, and a first control circuit 55. A true value table shown in FIG. 5 is memorized in the first memory 53, into which data is arbitrarily writable.

The circuit 54 to decide dropping compares information from the first touch sensor 20 and the second touch sensor 21 with the true value table which is read out from the first memory 53, and decides whether or not the portable information processing apparatus 10 is in a dropping state.

The first control circuit 55 sets the hard disk drive 14 in a write inhibiting mode first and then in a withdrawal mode, when the circuit 54 decides that the portable information processing apparatus 10 is in a dropping state.

Once the hard disk drive 14 is in the write inhibiting mode, it is stopped to write information in the hard disk 41 by the magnetic head. In the withdrawal mode, the driving mechanism 44 is driven so that the arm 42 pivots greatly. Thus, the slider 43 can be withdrawn in the withdrawal area defined on a center side or outer circumference side of the hard disk 41.

A first column 71 in the true value table in FIG. 5 corresponds to the output signal of the first sensor 20. The second column 72 in the true value table corresponds to the output signal of the second sensor 21. The third column 73 in the true value table shows respective definitions. For instance, in case that the first column 71 shows "1" and the second column 72 shows "1", the state of the portable information processing apparatus 10 is defined as "normal" in the third column 73. Similarly, in case that first column 71 shows "0" and the second column 72 shows "0", the state of the portable information processing apparatus 10 is defined as "dropping" in the third column 73 as well as when the first column 71 shows "1" and the second column 72 shows "0" or first column 71 shows "0" and the second column 72 shows "1".

The acceleration sensor related part 52 in FIG. 4 includes a second memory 56, an A/D converter circuit 57, a circuit 58 to decide a threshold value, a third memory 59, a display driving circuit 60, a second control circuit 61 and a timer circuit 62.

The second memory 56 memorizes the impact power to give damage to the hard disk drive 14, namely the limit power of the impact resistance of the hard disk apparatus 14, for instance, 100 G.

The A/D converter circuit 57 converts the acceleration detected by the acceleration sensor 45 in the hard disk drive 14 to a digital signal. The circuit 58 to decide a threshold value decides whether or not the acceleration detected by the acceleration sensor 45 is beyond the limit of the impact power.

The third memory 59 memorizes the acceleration beyond the limit of the impact power in case that the circuit 58 decides that the acceleration detected by the acceleration sensor 45 is beyond the limit of the impact power. In this case, the display driving circuit 60 drives the liquid crystal and displays the acceleration which is beyond the limit of the impact power on the liquid crystal.

The timer circuit 62 sets, for example, 500 ms at first. The timer circuit 62 starts counting down when the circuit 54 decides that the portable information processing apparatus 10 is in a dropping state. The timer circuit 62 keeps counting down until the time is zero.

The timer circuit 62 decides a time period during which the first control circuit 55 drives, the timing when the third memory 59 memorizes the acceleration, the timing when the second circuit 61 drives, and others. The second circuit 61 controls the display driving circuit 60 and others.

A description will now be given of the operation of the control apparatus 50 in a state where the portable information processing apparatus 10 set on the table 49 stably starts dropping from the table 49. After the touch sensor related part 51 drives, the acceleration sensor related part 52 drives.

Once the portable information processing apparatus 10 stably set on the table 49 starts dropping from the table 49, the output signals of the first touch sensor 20 and the second touch sensor 21 vary from "1, 1" to "0, 0" because the first touch sensor 20 and the second touch sensor 21 leave from the table 49 and do not touch the table 49.

The circuit 54 to decide dropping decides a state where the portable information processing apparatus 10 is dropping by comparing the above signal "0, 0" with the true value table which is read out from the first memory 53.

The first touch sensor 20 and the second touch sensor 21 directly detect a state in which the portable information processing apparatus 10 is in contact with the table, operator's knees or others. Hence, the sensors 20 and 21 can quickly and precisely sense a change from the contacting state to the non-contacting state. It is therefore possible to quickly and precisely decide that the portable information processing apparatus 10 falls in the dropping state.

Once the circuit 54 decides that the portable information processing apparatus 10 falls in the dropping state, the first control circuit 55 sets the hard disk apparatus 14 in the first inhibiting mode first and then in the withdrawal mode.

Before the portable information processing apparatus 10 drops on the floor, that is, while the portable information processing apparatus 10 is in the air, it stops information writing in the hard disk 41 by the magnetic head and the slider 43 is withdrawn to the withdrawal area defined on the center side or outer circumference side of the hard disk 41.

Therefore, even if the portable information processing apparatus 10 drops to the floor and is impacted heavily, it is possible to avoid a situation in which the recording of information records is broken due to a change of the position of the slider and to avoid occurrence of an accident in which the slider hits against the hard disk and scratches the surface of the recording area of the hard disk.

When the portable information processing apparatus 10 drops on the floor and the acceleration sensor 45 senses impact, the circuit 58 decides whether or not the acceleration sensed by the acceleration sensor 45 is beyond the limit of the impact power memorized in the second memory 56.

If the circuit 58 decides that the acceleration detected by the acceleration sensor 45 is beyond the limit of the impact power memorized in the second memory 56, the third memory 59 memorizes the acceleration. After that, the display driving circuit 60 drives the liquid crystal and displays the acceleration on the liquid crystal 12. The third memory 59 also memorizes its past record with respect to the dropping of the portable information processing apparatus 10.

If the portable information processing apparatus 10 drops on a soft material such as a cushion, and the acceleration sensed by the acceleration sensor 45 is lower than the limit of the impact power memorized in the second memory 56, the acceleration is not memorized in the third memory 59 and is not displayed on the liquid crystal 12.

Now, a description will be given of a state where the operator picks the portable information processing apparatus 10 up from the table by grasping the X1-direction side 11c and the X2-direction side 11e with hands in order to show indications on the screen of the liquid crystal panel 12 to other persons during the progress of the operation on the table.

In this particular state, the output signals of the first touch sensor 20 and the second touch sensor 21 keep "1, 1" because operator's respective hands' fingers are touching the first touch sensor 20 and the second touch sensor 21. Therefore, the circuit 54 to decide dropping does not decide that the portable information processing apparatus 10 is dropping.

Accordingly, writing information in the hard disk 41 by the magnetic head is not stopped, and the slider 43 is not withdrawn to the withdrawal area of the hard disk 41. Hence, when the operator operates the portable information processing apparatus 10 on the table again after the operator picks up the portable information processing apparatus 10 from the table by grasping the portable information processing apparatus 10 with hands, it is possible to restart operating the portable information processing apparatus 10 soon without waiting for a state where the portable information processing apparatus 10 can be operated, and the operator keeps operating the portable information processing apparatus 10 on the table.

Figure 6:
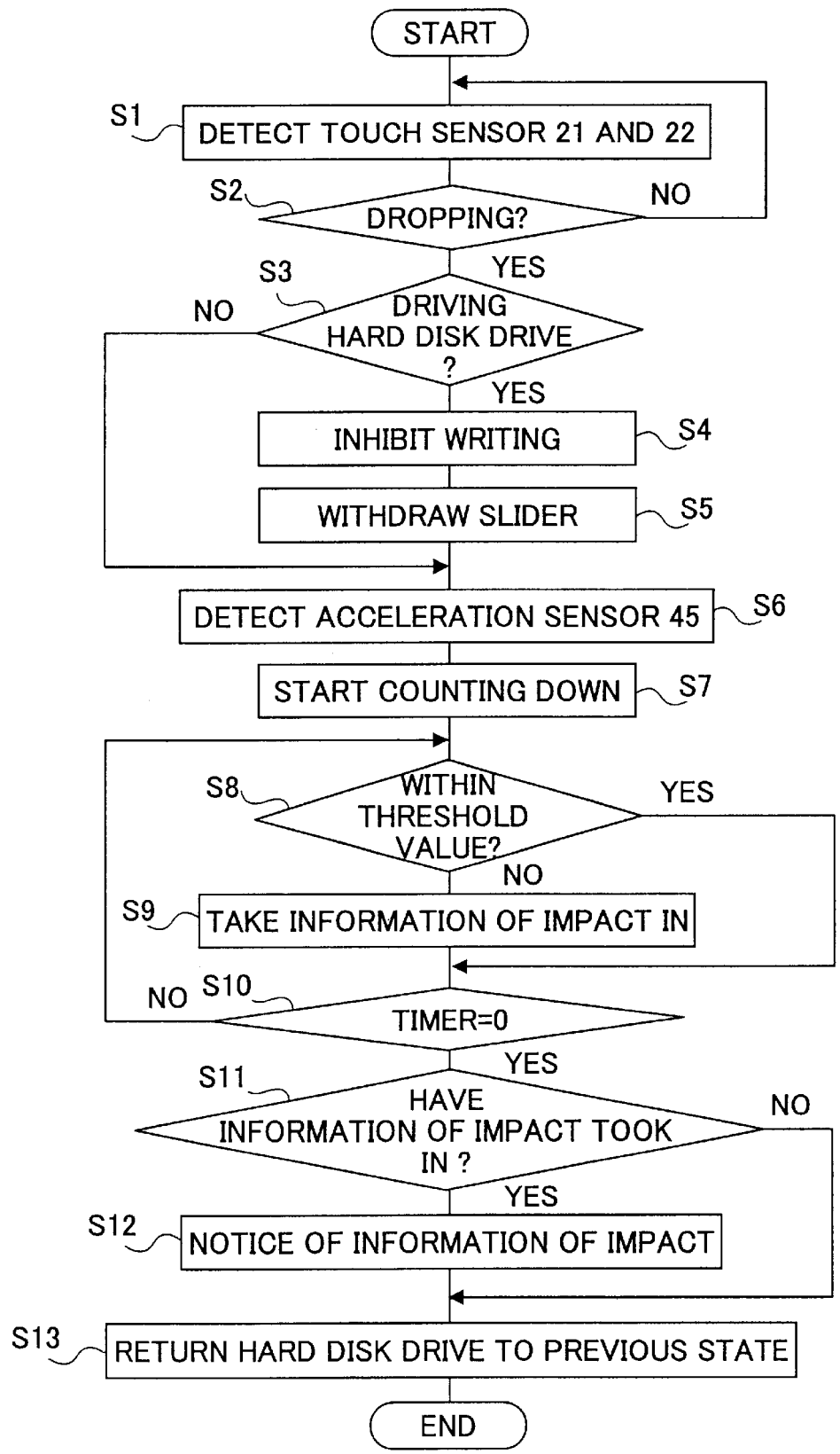
FIG. 6 is a flow chart showing an action of a microcomputer comprising a control apparatus of the portable information processing apparatus according to present invention.

Most of the touch sensor related part 51 and the acceleration sensor related part 52 are implemented by a microcomputer. The microcomputer operates as shown in FIG. 6.

The microcomputer watches the first touch sensor 20 and the second touch sensor 21 in step 1, and decides whether or not the portable information processing apparatus 10 is dropping in step 2.

If the result of the decision of the step 2 is YES, the microcomputer decides whether or not the hard disk 41 is working in step 3. If the result of the decision of the step 2 is NO, the microcomputer goes back to step 1. If the result of the decision of the step 3 is YES, the microcomputer stops writing information in the hard disk 41 by the magnetic head in step 4; then withdraws the slider 43 to the withdrawal area of the hard disk 41 in step 5; watches the acceleration sensor 45 in step 6; and then makes the timer circuit 62 start counting down in step 7.

If the result of the decision of the step 3 is NO, the microcomputer skips the step 4 and the step 5 and goes to step 6. Following the step 7, the microcomputer decides whether or not the acceleration detected by the acceleration sensor 45 is within the threshold value in step 8.

If the result of the decision of the step 8 is NO, the microcomputer takes the information about the impact in at step 9. Next, the microcomputer decides whether or not the value of the timer circuit 62 is zero in step 10. If the result of the decision of the step 8 is YES, the microcomputer skips the step 9 and goes to step 10.

If the decision made in step 10 is YES, the microcomputer decides whether or not the information about the impact taken in is available in step 11. If the decision result of the step 11 is YES, the microcomputer gives the liquid crystal a notice of the information about the impact in step 12, and then, as a step 13, makes the hard disk 41 return to a state in which information can be written in the hard disk 41 by the magnetic head. After step 13, the microcomputer finishes driving. If the result of the decision of the step 11 is NO, the microcomputer skips the step 12 and goes to step 13.

The true value table applied to the portable information processing apparatus 10 and shown in FIG. 5 can be modified on the user side. The following description is directed to such a modification of the true value table.

Figure 7:
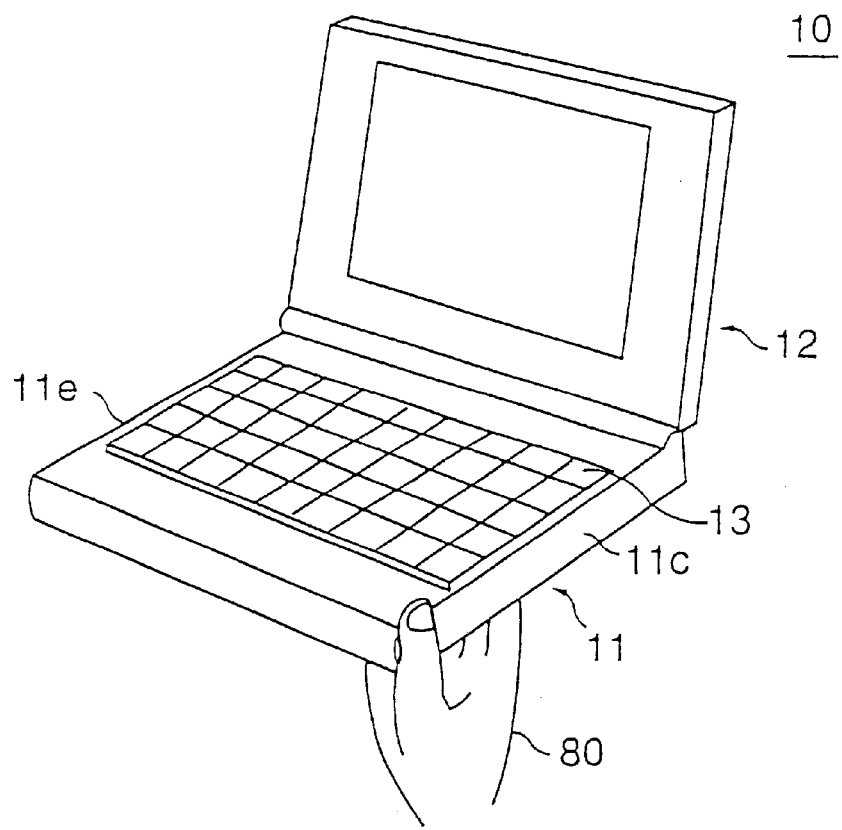
FIG. 7 is a perspective view showing a state where the portable information processing apparatus showed in FIG. 1 is supported by a operator's one hand.

It is assumed that the operator picks up the portable information processing apparatus 10 from the table by grasping the X1-direction side 11c of the housing 11 with an operator's right hand 80 as shown in FIG. 7. In this case, the operator modifies the memorized contents of the first memory 53 shown in FIG. 4 memorizing the true value table in FIG. 5 and has the true value table shown in FIG. 8 memorized in the first memory 53.

The true value table in FIG. 8 is different from the one in FIG. 5 only in that "1, 0" of the output signals of the first touch sensor 20 and the second touch sensor 21 is "normal" as well as "1, 1" of the output signals of the first touch sensor 20 and the second touch sensor 21. Except for the above respect, the true value table in FIG. 8 is same as one in FIG. 5.

Accordingly, if the operator handles the portable information processing apparatus 10 as shown in FIG. 7, and the output signals of the first touch sensor 20 and the second touch sensor 21 are "1, 0", the circuit 54 to decide dropping still decides the state is normal. Therefore, writing information in the hard disk 41 by the magnetic head is not stopped, and the slider 43 is not withdrawn to the withdrawal areas of the hard disk 41.

Hence, when the operator operates the portable information processing apparatus 10 on the table again after the state where the operator picks up the portable information processing apparatus 10 from the table by grasping the portable information processing apparatus 10 with hands, it is possible to restart operating the portable information processing apparatus 10 soon without waiting for a state where the portable information processing apparatus 10 can be operated as well as the operator keeps operating the portable information processing apparatus 10 on the table.

It is possible to provide a third touch sensor to the leg part 27 and a fourth touch sensor to the leg part 28 in addition to the first touch sensor 20 and the second touch sensor 21. The portable information processing apparatus 10 may also be equipped with a first pressure sensor and a second pressure sensor to detect its own weight instead of the first touch sensor 20 and the second touch sensor 21.

[Second Embodiment]

Figure 9:
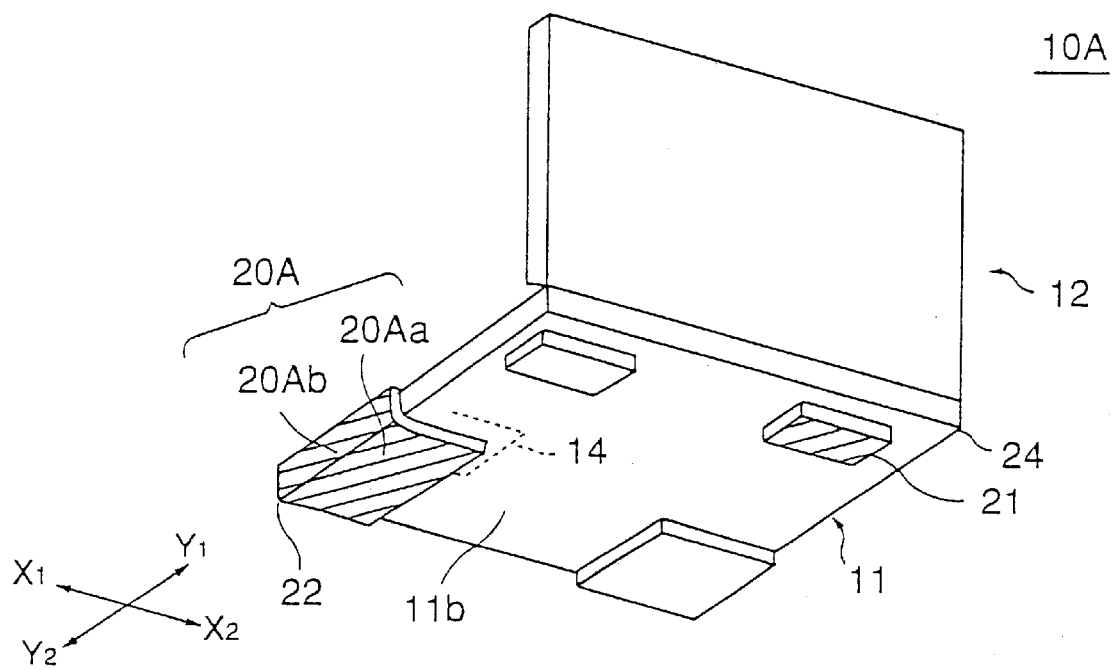
FIG. 9 is a bottom and perspective view showing a second example of a portable information processing apparatus according to the present invention.

FIG. 9 shows a portable information processing apparatus 10A according to a second embodiment of the present invention. The portable information processing apparatus 10A can be used on the operator's knees or on the table as well as the portable information processing apparatus 10 can.

The structure of the portable information processing apparatus 10A is same as that of the portable information processing apparatus 10 shown in FIGS. 1A and 1B, except for a first touch sensor 20A. Therefore, any part shown in FIG. 9 that is the same as a part shown in FIGS. 1A and 1B is denoted by the same reference numeral in these figures, and a description thereof is omitted.

The portable information processing apparatus 10A includes the first touch sensor 20A and the second touch sensor 21. The portable information processing apparatus 10A is expected to be picked up from the table by grasping the X1-direction side 11c of the housing 11 with the operator's right hand 80 in order to show indications on the screen of the liquid crystal panel 12 to other persons during the progress of the operation on the table. The concrete place to grasp is the front side 11d of the side 11c, namely a place adjacent to the corner 22, due to the location of the keyboard 13. The operator's left hand is secondarily used to grasp the X2-direction side 11e of the housing 11 if necessary.

Figure 10:
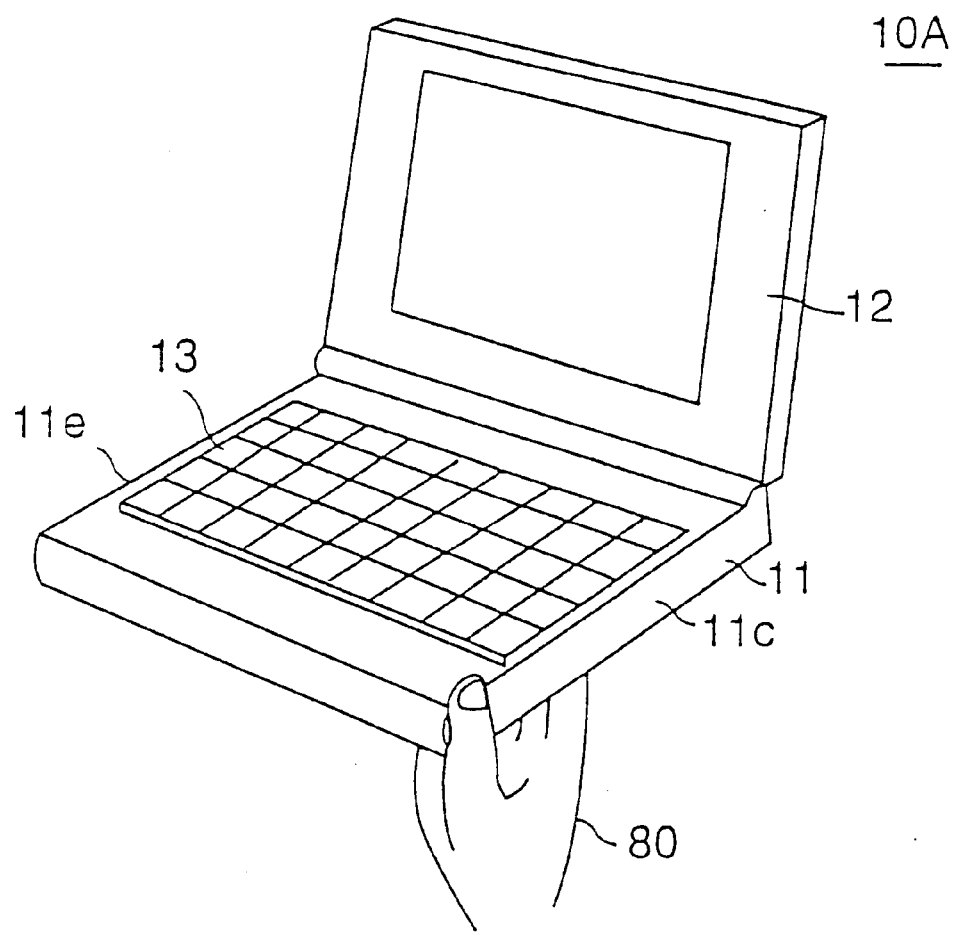
FIG. 10 is a perspective view showing a state where the portable information processing apparatus shown in FIG. 9 is supported by an operator's hand.

The first touch sensor 20A is provided taking into consideration a state where the operator grasps the portable information processing apparatus 10A as shown in FIG. 10. More particularly, the first sensor 20A is formed at the place adjacent to the corner 22 of the housing 11 and is provided on not only the bottom side 11b of the housing 11 but also the side 11c thereof. The first sensor 20A includes a touch sensor part 20Aa for the bottom side and a touch sensor part 20Ab for the side. The touch sensor part 20Aa for the bottom side is bigger than the first touch sensor 20 in FIG. 1B and reaches the corner 22.

Figure 11:
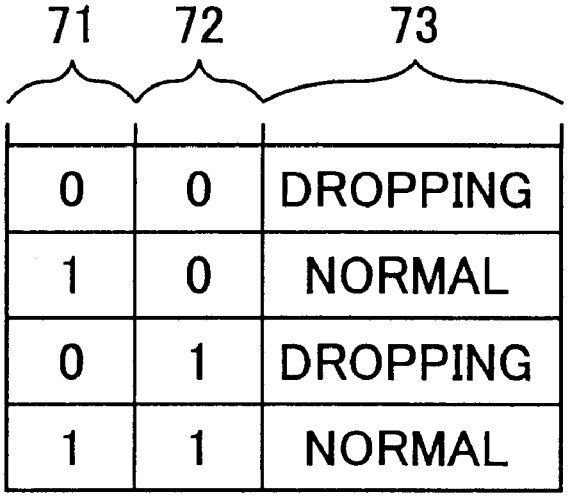
FIG. 11 is a view showing a true value table in a state where the portable information processing apparatus is supported by the operator's hand according to FIG. 9.

Considering that the operator grasps the portable information processing apparatus 10A as shown in FIG. 10, the true value table memorized in the first memory 53 is constructed as FIG. 11 shows. The table of the true value in FIG. 11 is different from that in FIG. 5 as regards only that "1, 0" of the output signals of the first touch sensor 20A and the second touch sensor 21 is "normal" as well as "1, 1" of the output signals of the first touch sensor 20A and the second touch sensor 21. Except the above respect, the true value table in FIG. 11 is same as the one in FIG. 5.

Therefore, the output signals of the first touch sensor 20A and the second touch sensor 21 are "1, 1" in a state where the portable information processing apparatus 10A is on the table and the circuit 54 to decide dropping in FIG. 4 decides the state is normal.

If the portable information processing apparatus 10A is picked up from the table by grasping the X1-direction side 11c of the housing 11 with the operator's right hand 80 as shown in FIG. 10, the output signals of the first touch sensor 20A and the second touch sensor 21 are not "0, 0" but "1, 0", so that the circuit 54 to decide dropping in FIG. 4 decides the state is normal.

Accordingly, writing information in the hard disk 41 by the magnetic head is not stopped and the slider 43 is not withdrawn to the withdrawal areas of the hard disk 41.

Hence, when the operator operates the portable information processing apparatus 10A on the table again after the operator picks up the portable information processing apparatus 10A from the table by grasping the portable information processing apparatus 10A with hands, it is possible to restart operating the portable information processing apparatus 10A soon without waiting for a state where the portable information processing apparatus 10A can be operated, and the operator keeps operating the portable information processing apparatus 10A on the table.

Once the portable information processing apparatus 10A starts dropping from the table or the knees, the first touch sensor 20A and the second touch sensor 21 are leaving from the table or the knees, so that the first touch sensor 20A and the second touch sensor 21 are not touching anything.

Accordingly, the output signals of the first touch sensor 20A and the second touch sensor 21 vary from "1, 1" to "0, 0" and the circuit 54 to decide dropping in FIG. 4 decides that the portable information processing apparatus 10A is dropping. The activation after that is same as the first embodiment of the present invention and the explanation is omitted.

It is possible to equip the portable information processing apparatus 10 with a first pressure sensor and a second pressure sensor to detect its own weight instead of the first touch sensor 20A and the second touch sensor 21.

[Third Embodiment]

Figure 12A:
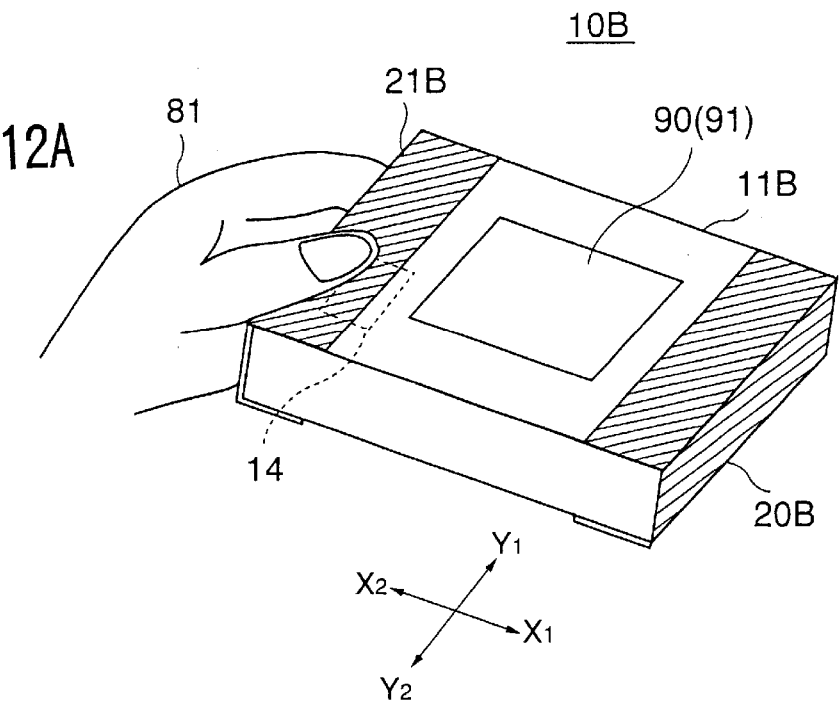
FIGS. 12A and 12B are perspective views showing a third example of a portable information processing apparatus according to the present invention.
Figure 12B:
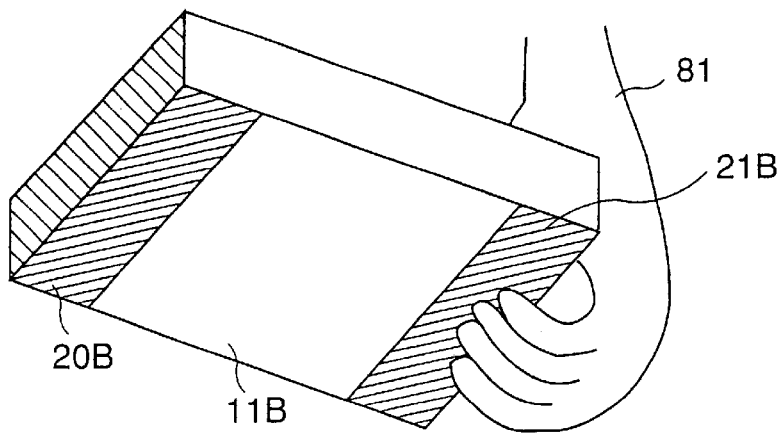

FIGS. 12A and 12B are respectively a front and perspective view and a bottom and perspective view of a portable information processing apparatus 10B according to a third embodiment of the present invention. The portable information processing apparatus 10B is a handheld type.

If the operator is a right-handed person, the operator grasps the X2-direction side of the housing 11B with left hand 81 to support the portable information processing apparatus 10B and operates the portable information processing apparatus 10B by pushing some places at the touch panel 91 of the surface of the liquid crystal panel 90 with an input pen in the right hand.

If the operator is a left-handed person, the operator grasps the X1-direction side of the housing 11B with right hand to support the portable information processing apparatus 10B and operates the portable information processing apparatus 10B by pushing some places at the touch panel 91 of the surface of the liquid crystal panel 90 with an input pen in the left hand. The hard disk drive 14 is included in the housing 11B.

A first touch sensor 20B is at the X1-direction side of the housing 11B and a second touch sensor 21B at the X2 direction side of the housing 11B. A first touch sensor 20B and the second touch sensor 21B are formed over the whole width of the housing 11B in the Y1-Y2 direction along a bottom side, a side, and an upper side thereof.

Figure 13:
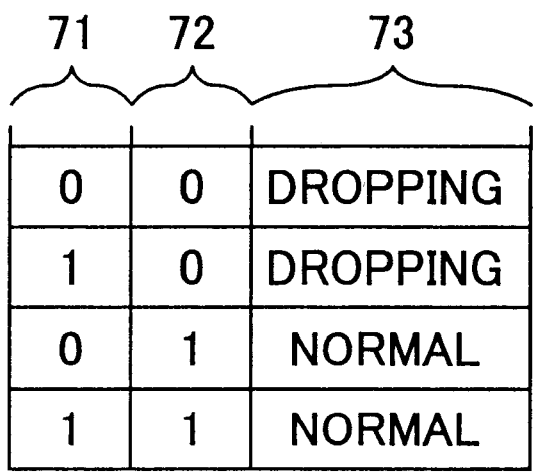
FIG. 13 is a view showing a true value table in a state where the portable information processing apparatus is supported by the operator's hand according to FIG. 12.

If the operator is a right-handed person, a true value table shown in FIG. 13 is memorized in the first memory 53 in FIG. 4. The true value table in FIG. 13 is different from the true value table in FIG. 5 only in that "0, 1" of the output signals of the first touch sensor 20B and the second touch sensor 21B is "normal" as well as "1, 1" of the output signals of the first touch sensor 20B and the second touch sensor 21B. Except for the above respect, the table of the true value in FIG. 13 is the same as that shown in FIG. 5.

Therefore, the circuit 54 to decide dropping in FIG. 4 decides that the state is normal when the portable information processing apparatus 10B is grasped and operated as shown in FIGS. 12A and 12B, as well as when the portable information processing apparatus 10B is on the table.

Figure 14:
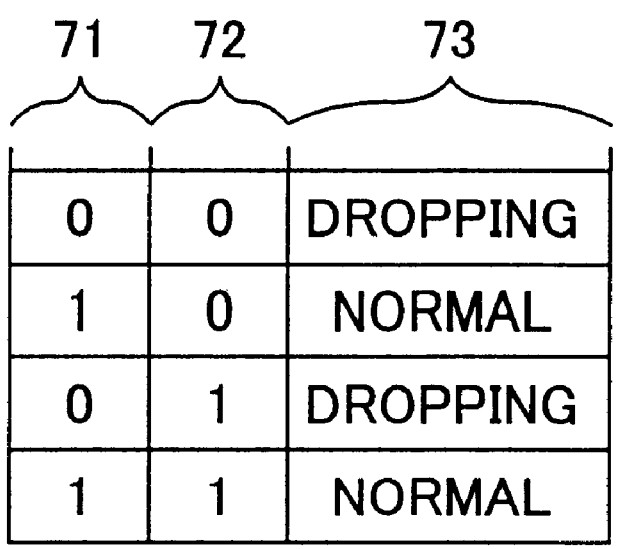
FIG. 14 is a view showing another true value table in a state where the portable information processing apparatus is supported by the operator's hand according to FIG. 12.

If the operator is a left-handed person, a true value table shown in FIG. 14 is memorized in the first memory 53 in FIG. 4. The table of the true value in FIG. 14 is different from that in FIG. 13 as regards only that "0, 1" of the output signals of the first touch sensor 20B and the second touch sensor 21B is "dropping" and"1, 0" of the output signals of the first touch sensor 20B and the second touch sensor 21B is "normal". Except for the above respects, the table of the true value in FIG. 14 is the same as that in FIG. 13.

Therefore, the circuit 54 to decide dropping in FIG. 4 decides the state is normal when the X1-direction side of the portable information processing apparatus 10B is grasped by the operator's right hand and operated, as well as when the portable information processing apparatus 10B is on the table.

If the operator drops the portable information processing apparatus 10B in error, the output signals of the first touch sensor 20B and the second touch sensor 21B is "0, 0" at the time when the portable information processing apparatus 10B leaves from the operator's hand, so that the circuit 54 to decide dropping in FIG. 4 decides the state is dropping. Accordingly, writing information in the hard disk 41 by the magnetic head is stopped, and the slider 43 is withdrawn to the withdrawal areas of the hard disk 41. The activation after that is the same as the first embodiment of the present invention and the explanation thereof is omitted.

It is possible to equip the portable information processing apparatus 10B with a first pressure sensor and a second pressure sensor to detect its own weight instead of the first touch sensor 20B and the second touch sensor 21B.

[Fourth Embodiment]

Figure 15A:
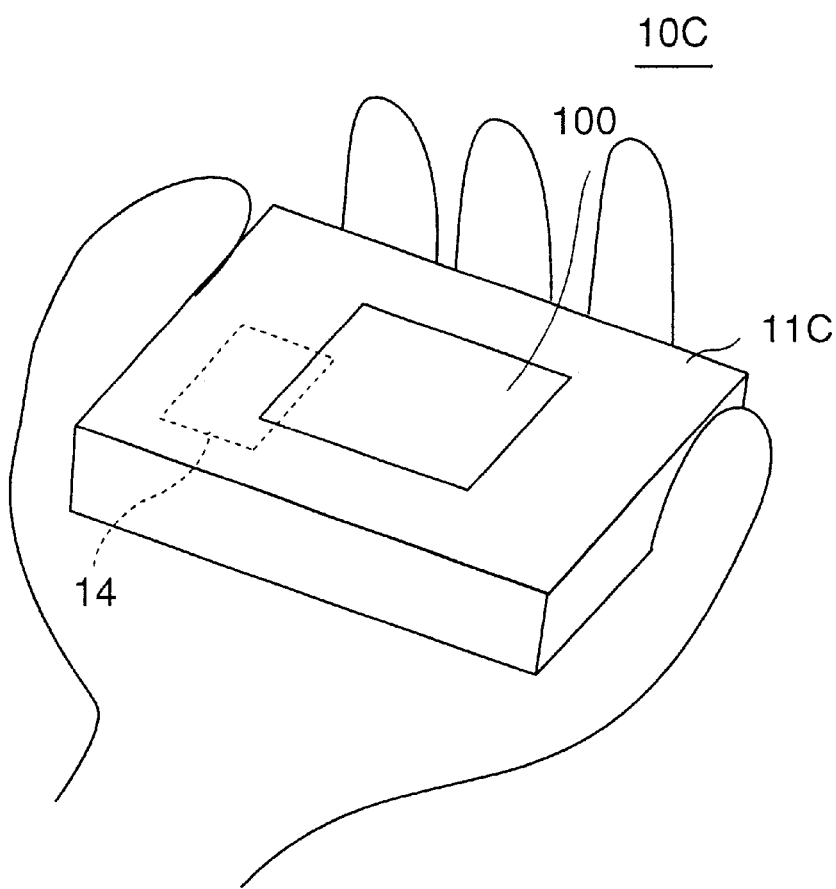
FIGS. 15A and 15B are perspective views showing a fourth example of a portable information processing apparatus according to the present invention.
Figure 15B:
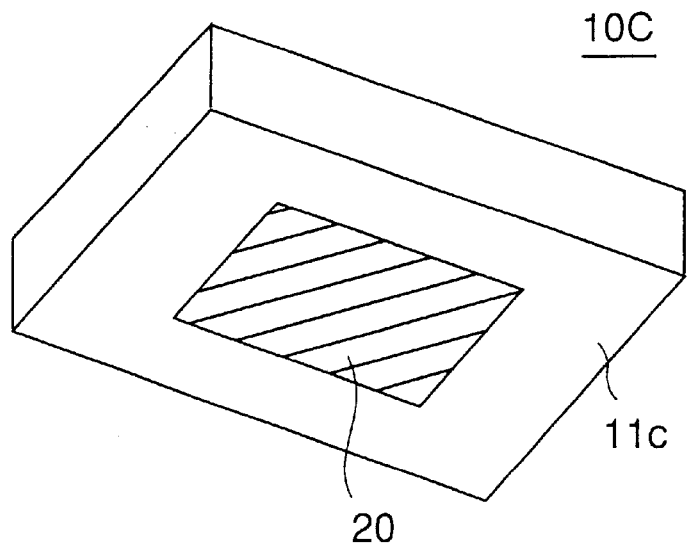

FIGS. 15A and 15B are respectively a front and perspective view and a bottom and perspective view of a portable information processing apparatus 10C according to a fourth embodiment of the present invention. The portable information processing apparatus 10C is of a palmtop type and can be used on the operator's palm to support the portable information processing apparatus 10C.

A liquid crystal panel 100 is provided on the upper side of a housing 11C, and a touch sensor 20C is provided on a bottom side thereof so as to be located in the center of the bottom side. The hard disk drive 14 is included in the housing 11C.

Figure 16:
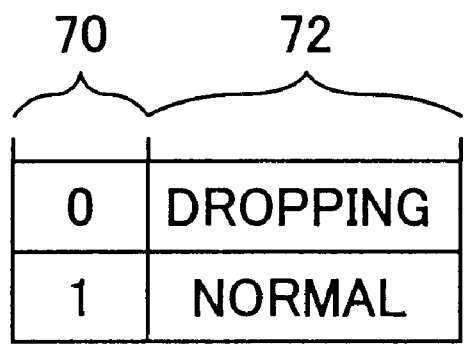
FIG. 16 is a view showing a true value table in a state where the portable information processing apparatus is supported by the operator's hand according to FIG. 15.

A true value table shown in FIG. 16 is memorized in the first memory 53 in FIG. 4.

The touch sensor 20C outputs a signal "1" and the circuit 54 to decide dropping in FIG. 4 decides the state is normal in the case that the portable information processing apparatus 10C is on the operator's palm and operated, as well as when the portable information processing apparatus 10C is on the table.

If the operator drops the portable information processing apparatus 10C in error, the output signal of the touch sensor 20C is "0" when the portable information processing apparatus 10C leaves the operator's hand, so that the circuit 54 to decide dropping in FIG. 4 decides the portable information processing apparatus 10C is dropping. Accordingly, writing information in the hard disk 41 by the magnetic head is stopped and the slider 43 is withdrawn to the withdrawal areas of the hard disk 41. The activation after that is the same as the first embodiment of the present invention and an explanation thereof is omitted.

It is possible to equip the portable information processing apparatus 10C with a first pressure sensor and a second pressure sensor to detect its own weight instead of the first touch sensor 20C.

What is claimed is:

1. An electronic device comprising:
   a housing;
   sensors attached to said housing, said sensors outputting sense signals respectively indicating whether said sensors touch an object; and
   a decision device that makes a decision as to whether said electronic device has started dropping on the basis of a combination of the sense signals outputted by said sensors.

2. The electronic device as claimed in claim 1, wherein said decision device makes a decision by referring to logical values of the sense signals.

3. The electronic device as claimed in claim 1, wherein said decision device comprises a comparing device that compares the combination of the sense signals outputted by said sensors with predetermined combinations of sense signals.

4. The electronic device as claimed in claim 1, wherein said decision device further determines which one of predetermined combinations of sense signals coincides with the combination of the sense signals outputted by the sensors.

5. The electronic device as claimed in claim 1, wherein decision device comprises: a memory that stores a table in which possible combinations of sense signals related to modes of the electronic device are defined; and a comparing device that compares the combination of the sense signals outputted by the sensors with the table.

6. The electronic device as claimed in claim 5, wherein the memory comprises a rewritable table so that the possible combinations of sense signals can be changed.

7. The electronic device as claimed in claim 1, further comprising a hard disk drive provided in said housing; and a control device that controls a mode of said electronic device so that the electronic device is set in a write inhibiting mode in which data is inhibited from being written into the hard disk drive and is then set in a withdrawal mode in which a magnetic head of the hard disk drive is withdrawn in a predetermined withdrawal area.

8. The electronic device as claimed in claim 7, further comprising an acceleration sensor that senses an acceleration exerted on said electronic device, wherein said control device changes the mode of said electronic device from said withdrawal mode to a mode in which data is allowed to be written into said hard disk drive, when the acceleration sensed by said acceleration sensor is lower than a threshold level.

9. The electronic device as claimed in claim 1, further comprising an acceleration sensor sensing an acceleration exerted on said electronic device.

10. The electronic device as claimed in claim 1, wherein said sensors are provided to a bottom surface of said housing.

11. The electronic device as claimed in claim 1, wherein said sensors are provided to a bottom surface of said housing and are located on an imaginary diagonal line connecting corners of said housing.

12. The electronic device as claimed in claim 1, wherein said sensors are provided to a bottom surface and another surface of said housing.

13. The electronic device as claimed in claim 1, wherein said sensors are provided to integrally extend bottom, side and top surfaces of said housing.

14. The electronic device as claimed in claim 1, wherein each of said sensors is one of a touch sensor and a pressure sensor.

15. The electronic device as claimed in claim 1, wherein said electronic device is a portable information processing apparatus.

16. The electronic device as claimed in claim 1, wherein said sensors are located in positions touchable by a hand or hands of an operator in order to support said electronic device.

17. An electronic device comprising:

a housing;

a sensor attached to said housing, said sensor outputting a sense signal indicating whether said sensor touches an object; and a decision device that makes a decision as to whether said electronic device has started dropping on the basis of the sense signal outputted by said sensor.

18. The electronic device as claimed in claim 17, wherein said sensor is attached to said housing and is located in a position in which said sensor touches a hand of an operator in support of said electronic device.

19. The electronic device as claimed in claim 17, further comprising a hard disk drive provided in said housing; and a control device that controls a mode of said electronic device so that the electronic device is set in a write inhibiting mode in which data is inhibited from being written into the hard disk drive and is then set in a withdrawal mode in which a magnetic head of the hard disk drive is withdrawn in a predetermined withdrawal area.

20. The electronic device as claimed in claim 17, further comprising an acceleration sensor sensing an acceleration exerted on said electronic device.

21. The electronic device as claimed in claim 19, further comprising an acceleration sensor that senses an acceleration exerted on said electronic device, wherein said control device changes the mode of said electronic device from said withdrawal mode to a mode in which data is allowed to be written into said hard disk drive, when the acceleration sensed by said acceleration sensor is lower than a threshold level.

22. The electronic device as claimed in claim 17, wherein said electronic device is a portable information processing apparatus.

23. The electronic device as claimed in claim 17, wherein said sensors are located in positions touchable by a hand or hands of an operator in order to support said electronic device.

* * * * *